US 6,285,155 B1

(12) United States Patent
Maske et al.

(10) Patent No.: US 6,285,155 B1
(45) Date of Patent: *Sep. 4, 2001

(54) PSEUDO HALF-STEP MOTOR DRIVE METHOD AND APPARATUS

(75) Inventors: Rudolph J. Maske, San Jose; Marc R. Bunyard, Fremont; Peter A. Holst, Castro Valley, all of CA (US)

(73) Assignee: Abbott Laboratories, Abbott Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,586

(22) Filed: Oct. 29, 1999

(51) Int. Cl.⁷ .................................................. H02P 8/32

(52) U.S. Cl. ............................................................ 318/685

(58) Field of Search ..................................... 318/685, 696

(56) References Cited

U.S. PATENT DOCUMENTS

| 4,286,202 | * | 8/1981 | Clancy et al. ..................... 318/696 |
| 4,346,707 |   | 8/1982 | Whitney et al. . |
| 4,385,247 |   | 5/1983 | Satomi . |
| 4,407,659 |   | 10/1983 | Adam . |
| 4,468,601 | * | 8/1984 | Chamran et al. .................. 318/696 |
| 4,475,666 |   | 10/1984 | Bilbrey et al. . |
| 4,480,218 | * | 10/1984 | Hair ................................... 318/696 |
| 4,627,835 |   | 12/1986 | Fenton, Jr. . |
| 4,652,260 |   | 3/1987 | Fenton, Jr. et al. . |
| 4,677,359 |   | 6/1987 | Enami et al. . |
| 4,683,428 |   | 7/1987 | Gete . |
| 4,691,153 |   | 9/1987 | Nishimura ....................... 318/696 |
| 4,697,129 |   | 9/1987 | Enami et al. . |
| 4,764,697 |   | 8/1988 | Christiaens . |
| 4,803,389 | * | 2/1989 | Ogawa et al. ..................... 310/49 R |
| 4,818,186 |   | 4/1989 | Pastrone et al. . |
| 4,842,584 |   | 6/1989 | Pastrone et al. . |
| 4,851,755 |   | 7/1989 | Fincher . |
| 4,854,324 |   | 8/1989 | Hirschman et al. . |
| 4,884,013 |   | 11/1989 | Jackson et al. . |
| 4,908,017 |   | 3/1990 | Howson et al. . |
| 4,910,475 |   | 3/1990 | Lin . |
| 4,927,411 |   | 5/1990 | Pastrone et al. . |
| 5,028,857 |   | 7/1991 | Taghezout ......................... 318/696 |
| 5,132,603 |   | 7/1992 | Yoshimoto . |
| 5,176,646 |   | 1/1993 | Kuroda . |
| 5,219,099 |   | 6/1993 | Spence et al. . |
| 5,374,865 |   | 12/1994 | Yoshimura et al. . |
| 5,444,316 |   | 8/1995 | Ohya et al. . |

(List continued on next page.)

FOREIGN PATENT DOCUMENTS 0 341 582 A1   11/1989   (EP) .

Primary Examiner—Bentsu Ro
(74) Attorney, Agent, or Firm—Beth A. Vrioni; Brian R. Woodworth

(57) ABSTRACT

A method and apparatus for driving a stepper motor such that when the motor is stepped, the velocity of the motor is substantially zero upon reaching a new stepped position, thereby eliminating overshoot and ringing, and the wasted energy associated with these effects. The method comprises energizing at least one of the stepper motor windings at a predetermined current level for a predetermined step time, wherein the current level is determined as a function of the step time and dynamic single-step response characteristics of the stepper motor and load so that the motor velocity is substantially zero when the adjacent stepped position is reached. At this point, the stepper motor windings that were energized to make the rotor of the motor move are de-energized, whereupon the rotor is held in place by the inherent detent torque of the stepper motor. Since the velocity of the motor is substantially zero when the adjacent stepped position is achieved, there is no overshoot, and thus ringing is eliminated.

19 Claims, 9 Drawing Sheets

U.S. PATENT DOCUMENTS

| | | |
|---|---|---|
| 5,480,294 | 1/1996 | DiPerna et al. . |
| 5,545,140 | 8/1996 | Conero et al. . |
| 5,637,095 | 6/1997 | Nason et al. . |
| 5,662,612 | 9/1997 | Niehoff . |
| 5,681,286 | 10/1997 | Niehoff . |
| 5,691,613 | 11/1997 | Gutwillinger . |
| 5,695,464 | 12/1997 | Viallet . |
| 5,738,659 | 4/1998 | Neer et al. . |
| 5,865,805 | 2/1999 | Ziemba . |

\* cited by examiner

PSEUDO HALF-STEP MOTOR DRIVE METHOD AND APPARATUS

FIELD OF THE INVENTION

The present invention generally relates to stepper motors, and more specifically, to a method and apparatus for driving a stepper motor that provides improved efficiency and eliminates overshoot and ringing.

BACKGROUND OF THE INVENTION

Stepper motors are well known in the art and are used in a wide variety of devices, including printers, disk drives, and other devices requiring precise positioning of an element. Stepper motors provide many advantages over other types of motors, most notably the ability to rotate through controlled angles of rotation, called steps, based on command pulses from a driver circuit. The accuracy of the stepped motion produced by a stepper motor is generally very good, since there is not a cumulative error from one step to another. The ability to incrementally rotate a shaft through a defined number of fixed steps enables stepper motors to be used with open-loop control schemes (i.e., applications in which a position feedback device such as an optical encoder or resolver is unnecessary), thereby simplifying the motion control system and reducing costs.

The speed of stepping motors can be readily controlled based on the pulse frequency employed, enabling stepping motors to achieve very low speed synchronous movement of a load that is directly coupled to the drive shaft of the motor. Furthermore, stepper motors are reliable, since they do not include contact brushes that can wear out. Typically, the only parts in a stepper motor susceptible to wear are the motor bearings.

There are three basic types of stepper motor, including a variable-reluctance (VR), a permanent magnet (PM), and a hybrid (HB). A VR stepper motor comprises a soft iron multi-toothed rotor and a wound stator. When the stator windings (also commonly referred to as the motor "coils") are energized with a DC current, a magnetic flux is produced at the poles of the stator. Rotation occurs when the rotor teeth are magnetically attracted to the energized stator poles. PM stepper motors have permanent magnets added to the motor structure. The rotor no longer has teeth, as in the VR motor. Instead, the rotor includes permanent magnets with the alternating north and south poles disposed in a straight line, parallel to the rotor shaft. These magnetized rotor poles provide an increased magnetic flux intensity, resulting in improved torque characteristics when compared with VR stepper motors.

An HB stepper motor is more expensive than a PM stepper motor, but provides better performance with respect to step resolution, torque and speed. Typical step angles for the HB stepper motor range from 3.6° to 0.9° (100–400 steps per revolution). The HB stepper motor combines the best features of both the PM and VR type stepper motors; its rotor is multi-toothed, like the VR motor, and includes an axially magnetized concentric magnet around its shaft. The teeth on the rotor provide an even better flux path, which helps guide the magnetic flux to preferred locations in the air gap between the rotor and the stator teeth. This configuration further increases the detent, holding, and dynamic torque characteristics of the HB stepper motor, when compared with both the VR and PM stepper motors.

Stepper motors generally have two phases, but three, four and five-phase motors also exist. FIG. 1 shows a typical two-phase motor, comprising a stator A and a stator B, each of which produce a magnetic flux with opposite poles at end faces 300 when a respective phase A winding 302 and phase B winding 304 are energized with an electric current. The direction of the magnetic flux is determinable by applying the "right-hand rule." In FIG. 1, a current $I_B$ flows through the phase B windings, creating a magnetic flux in stator B, as indicated by the direction of the arrows. This flux produces a torque applied to the rotor, causing the rotor to turn so that the magnetic field produced by the poles in the rotor are aligned with the magnetic field produced by stators A and B. In this case, the rotor will rotate clockwise so that its south pole aligns with the north pole of stator B at a position 2, and its north pole aligns with the south pole of stator B at a position 6. To continually rotate the rotor, current is applied to the phase A and phase B windings in a predetermined sequence, producing a rotating magnetic flux field.

The output torque of the motor drive shaft is proportional to the intensity of the magnetic flux generated when the winding is energized. The basic relationship determining the intensity of the magnetic flux is defined by:

$$H=(N \times i) \div l \qquad (1)$$

where N is the number of winding turns, i is the current, H is the magnetic field intensity, and l is the magnetic flux path length. This relationship shows that the magnetic flux intensity, and consequently the torque, is proportional to the number of turns in the winding and the current, and is inversely proportional to the length of the magnetic flux path. In addition, stepper motors that include permanent magnets produce a built-in "detent" torque. This detent torque results from the magnetic flux generated by the permanent magnets, and is what produces the "cogging" effect that is felt when turning a PM or HB stepper motor that is not energized.

As shown in FIGS. 2A and 3A, a unipolar motor has one winding with a center tap per phase (two phase motors), or four windings with one winding per phase, typically sharing a common tap. (Some unipolar stepper motors are genuine four-phase motors, while other unipolar stepper motors are erroneously referred to as four-phase motors, even though they have only two phases.) Unipolar motors typically have either five or six leads. In comparison, as shown in FIGS. 2B and 3B, a bipolar motor generally comprises two phases, wherein each phase has a corresponding winding. Bipolar motors typically have four leads. Motors that have two separate windings per phase also exist and can be driven in either bipolar or unipolar mode.

A pole can be defined as a region on a magnetized body where the magnetic flux density is concentrated. Both the rotor and the stator of a stepper motor have poles. FIGS. 1, 2A, and 2B show simplified motors for illustrative purposes, while in reality, several more poles are normally included in both the rotor and stator structure in order to increase the number of steps per revolution of the motor (i.e., decrease the step angle). A PM stepper motor contains an equal number of rotor and stator pole pairs. Typically, the PM stepper motor has 12 pole pairs, and the stator has 12 pole pairs per phase. An HB stepper motor has a rotor with teeth that is split into two parts, separated by a permanent magnet, making half of the teeth south poles and half north poles. The number of pole pairs is equal to the number of teeth on one of the rotor halves. The stator of an HB motor also has teeth that increase the number of equivalent poles (i.e., smaller pole pitch, since the number of equivalent poles equals 360/teeth pitch) compared to the main poles, on which the winding coils are wound. Usually four main poles are used for 3.6° hybrid stepper motors and eight main poles are used for 1.8° and 0.9° stepper motors.

It is the relationship between the number of rotor poles and the equivalent stator poles, and the number of phases that determine the full-step angle of a stepper motor:

$$\text{Step angle} = 360 \div (N_{Ph} \times Ph) = 360/N \quad (2)$$

where $N_{Ph}$ is the number of equivalent poles per phase or the number of rotor poles, Ph is the number of phases, and N is the total number of poles for all phases.

There are four drive modes that are typically used to move and position stepper motors, including the wave drive (one phase on), full-step drive (two phases on), half-step drive (one and two phases on), and microstepping (continuously varying phase currents). The following discussion of these various drive modes references FIGS. 2A and 2B, and FIGS. 3A and 3B.

FIG. 3A shows a typical six-wire unipolar drive circuit. In order to drive a unipolar stepper motor, it is necessary to energize the windings of the motor in a predetermined sequence. This object can be accomplished through the use of four switches 50, 52, 54, and 56 (e.g., field effect transistor switches), each of which is connected to ground at one terminal, and to a respective winding at the other terminal. A positive supply voltage is provided at common or center taps 58 and 60. Current can be caused to flow through windings corresponding to motor phases A, $\overline{A}$, B and $\overline{B}$ by respectively closing switches 50, 52, 54, and 56, each of which provides a path to ground through its corresponding winding. When current flows through the windings, a magnetic field is generated based on the right-hand rule, which causes the rotor to rotate so that it is aligned with the magnetic field generated by stators A and B.

A somewhat more complicated scheme is used for driving a bipolar motor. As shown in FIG. 3B, a typical bipolar drive circuit comprises a pair of H-bridge circuits, one for each winding. Each of the H-bridge circuits comprises four switches 62, 64, 66, and 68. The branches at the top of the bridges are connected to a positive supply voltage, while the branches at the bottom of the bridges are connected to ground. By selectively closing the H-bridge switches, current can be caused to flow through windings 70 and 72 in a desired direction, thereby producing motor phases A, $\overline{A}$, B and $\overline{B}$. For example, to produce a current flow in winding 70 from right to left (i.e., motor phase A), switches 64 and 66 are closed, while switches 62 and 68 are left open.

In a wave drive for a stepper motor, only one winding is energized at any given time. The windings on the stators are energized according to the sequence A→B→$\overline{A}$→$\overline{B}$, causing the rotor to step through positions 8→2→4→6. For unipolar and bipolar wound motors with the same winding parameters, this excitation mode will result in the same mechanical position. The disadvantage of this drive mode is that in a unipolar wound motor, only 25% of the total motor winding is used at any given time, and in a bipolar motor, only 50% of the total motor winding is used. Thus, the maximum potential torque output of the motor is not realized.

In a full-step drive, two phases are energized at any given time. The windings on the stators are energized according to the sequence AB→$\overline{A}$B→$\overline{AB}$→A$\overline{B}$, causing the rotor to step through positions 1→3→5→7. When using the full-step mode, the angular movement will be the same as was discussed above for a wave drive mode, but the mechanical position is offset by one-half step. The torque output of a unipolar wound motor when using full-stepping is less than a bipolar motor (for motors with the same winding parameters), since the unipolar motor uses only 50% of the available winding, while the bipolar motor uses the entire winding. However, the unipolar motor requires only half as much energy as the bipolar motor.

The half-step drive mode combines both wave and full-step (one and two phases on) drive modes. As shown below in TABLE 1, the number of phases that are energized alternates between one and two phases during every other step. The windings on the stators are energized according to the sequence AB→B→$\overline{A}$B→$\overline{A}$→$\overline{AB}$→$\overline{B}$→A$\overline{B}$→A, causing the rotor to step through positions 1→2→3→4→5→6→7→8. The resulting angular movements are half of those discussed above for wave and full-step drive modes. Half-stepping can reduce a phenomena referred to as resonance, which sometimes occurs when using the wave or full-step drive modes.

TABLE 1

| | Wave Drive | | | | Normal Full Step Drive | | | | Half-step Drive | | | | | | | |
|---|---|---|---|---|---|---|---|---|---|---|---|---|---|---|---|---|
| Phase | 1 | 2 | 3 | 4 | 1 | 2 | 3 | 4 | 1 | 2 | 3 | 4 | 5 | 6 | 7 | 8 |
| A | ● | | | | ● | | | ● | ● | | | | | | ● | ● |
| B | | ● | | | ● | ● | | | ● | ● | ● | | | | | |
| $\overline{A}$ | | | ● | | | ● | ● | | | | ● | ● | ● | | | |
| $\overline{B}$ | | | | ● | | | ● | ● | | | | | ● | ● | ● | |

In a microstepping drive, the currents in the windings are continuously varied to divide one full step into many smaller discrete steps. Microstepping generally produces smoother movements of the drive shaft, with less torque ripple and resonance. Unfortunately, microstepping also requires control circuitry that is much more sophisticated (and costly) than the control circuits that are commonly used for the full and half-step drive modes.

The torque vs. angle characteristics of a stepper motor are dependent on the relationship between the displacement of the rotor and the torque, which is applied to the rotor shaft when the stepper motor is energized at its rated voltage. An ideal stepper motor has a sinusoidal torque vs. angular displacement characteristic as shown in FIG. 4A.

Positions A and C in FIG. 4A represent stable equilibrium points when no external force or load is applied to the rotor shaft. When an external force $T_A$ is applied to the motor shaft, it produces an angular displacement, $\theta_A$, which is referred to as a lead or lag angle depending on whether the motor is actively accelerating or decelerating. When the rotor stops with an applied load, it will come to rest at the position defined by this displacement angle. The motor develops a magnetic torque, $T_A$, in opposition to the applied external force in order to balance the load. As the load is increased, the displacement angle also increases until it reaches the maximum holding torque, $T_H$, of the motor. Once $T_H$ is exceeded, the motor enters an unstable region. In this region, a torque in the opposite direction is created, and the rotor jumps over the unstable point to the next stable point. This instability can cause the motor rotor to oscillate when it moves between adjacent steps.

The displacement angle is determined by the following relationship:

$$\theta = (p \div 2\pi) \cdot \sin^{-1}(T_l \div T_h), \text{ or } T_l = T_h \sin(2\pi\theta/p) \quad (3)$$

where, $\theta$ is the displacement angle, p is the rotor tooth pitch, $T_l$ is the load torque, and $T_h$ is the motor's rated holding torque.

FIG. 4B illustrates the relationship between torque vs. rotor angle when the holding torque of a motor is varied. It is clear that a system with a high torque/load ratio will be stable. Unfortunately, considerations such as motor weight and volume, available drive current, motor cost, etc., usually dictate that the torque/load ratio for a stepper motor system intended for a given application remain relatively low.

The performance of a stepper motor system (drive and motor) is also highly dependent on the mechanical parameters of the load being moved by the motor. The load is typically a combination of frictional and inertial loads. A frictional load generally comprises two components, a static frictional load component and a dynamic frictional load component. The static frictional load is a resistance to motion that exists when the motor is not moving. The dynamic frictional load is generally proportional to the velocity of the motor. A minimum torque level is required throughout a step to overcome the frictional load. Increasing a frictional load decreases the top speed, reduces the acceleration, and increases the positional error of the motor.

Inertia is a resistance to a change in rotational velocity. A high inertia load requires a high inertial starting torque, and also requires a high braking torque. Increasing the inertial load increase speed stability, increases the amount of time it takes to reach a desired speed, and decreases the maximum self-start pulse rate, as discussed below.

Rotor oscillations in a given stepper motor will depend on the particular friction and inertial loads that are present. Because of this relationship, unwanted rotor oscillations can be reduced by mechanical damping; however, it is often simpler to reduce these oscillations by applying electrical damping, such as by using half-step or microstepping drive modes.

A generalized torque vs. speed curve for a typical stepper motor is shown in FIG. 5. The torque vs. speed characteristic for a given stepper motor system will depend on the characteristics of the motor, the excitation mode, and type of drive or drive method. Several standard aspects of the speed-torque curve are referenced in the Figure. The holding torque is the maximum torque produced by the stepper motor when it is at rest. The area defined between the axes and the pull-in torque curve is referred to as the start/stop region. This curve defines the maximum frequency (i.e., steps per second) at which a motor can start (or stop) instantaneously, without loss of synchronism. The maximum start rate is the maximum no-load frequency. The area between the pull-in torque curve and the pull-out curve is referred to as the slew region. This region defines the maximum frequency at which the motor can operate without losing synchronism once it is moving. The maximum slew rate is the maximum operating no-load frequency.

The pull-in characteristics also vary with the load. The larger the load inertia, the smaller the pull-in area. It can be observed from the shape of the curve that the step rate affects the torque output capability of a stepper motor. The decrease in torque output as the speed increases is caused by the fact that at high speeds, the inductance of the motor begins to dominate the impedance of the phase windings, which decreases the current in the phase windings, thereby decreasing the magnetic flux (and torque) produced by the motor.

A typical rotor angle vs. time response to a single-step command input is shown in FIG. 6. When a single step pulse is applied to a stepper motor, the rotor starts to rotate to the next stepped position, through the angle $\theta$ for one step. The value t is the time it takes for the motor shaft to rotate through this angle. This step time is highly dependent on the ratios of torque to inertia (load), as well as the type of driver used.

Since the torque is a function of the displacement, it follows that the acceleration will also be a function of displacement. Therefore, when moving in large step increments, a high torque is developed, and consequently, a high acceleration results. The acceleration (and related rotational inertia) causes the motor to rotate past or overshoot the desired step angle, resulting in a decaying oscillation (commonly referred to as ringing), as shown in the Figure. The settling time, T, is the time required for these oscillations to cease.

This oscillation or ringing often creates problems in stepper motor applications. The overshoot and decaying oscillation results in wasted energy, and is especially noticeable when stepping the motor at low speeds. In addition, the ringing often produces an audible noise, which may be objectionable in certain environments. Furthermore, the ringing is often coupled into the load, which may result in undesired load vibrations.

An example of a device in which stepper motor overshoot and ringing is undesirable is shown schematically in FIG. 7. The device is a cassette infusion pump, which is used for infusing medicinal fluid into a patient's body at very precise flow rates, and further details of the device are disclosed in a co-pending, commonly assigned application, Ser. No. 09/464,812, filed Dec. 17, 1999, entitled "Method for Compensating for Pressure Differences Across Valves in Cassette Type IV Pump" the disclosure and drawings of which are hereby specifically incorporated herein by reference. (Note that the cassette infusion pump described in this co-pending application is a multi-channel pump, but a similar single channel pump is shown in FIG. 7 for illustrative purposes). A source 12 of medicinal fluid is coupled in fluid communication with a proximal end 16 of a cassette 15. The flow of medicinal fluid into the cassette is selectively controlled by a supply valve 20. After entering a passage in the cassette, the medicinal fluid flows through an air sensor 22 and into a mixing chamber 26. A proximal (or inlet) pressure sensor 24 is disposed adjacent to mixing chamber 26. The medicinal fluid exits the mixing chamber through an inlet valve 28, when the inlet valve is in its open position, and flows into a pumping chamber 30.

One side of chamber 30 is covered with an elastomeric membrane 29. Medicinal fluid is forced from pumping chamber 30 (when inlet valve 28 is closed and an outlet valve 32 is opened), as a plunger 42 acts on the elastomeric membrane, forcing the elastomeric membrane into the chamber to displace the fluid contained therein. This plunger action is facilitated by positioning a linear drive mechanism, e.g., a lead screw or ball screw (not shown) with a 3.6° stepper motor 19. In one embodiment of the cassette pump, the plunger position is variable from −489 steps to +220 steps, where a home position is nominally defined to be at 0 steps. A nominal stroke distance for plunger 42 to deliver 333 μl of fluid is +169 steps.

When outlet valve 32 is in its open position, the medicinal fluid forced from the chamber flows past a distal pressure sensor 34, through a distal air sensor 36, and exits the cassette through a tube set, through which it is conveyed to a patient 40. The infusion pump also includes a control unit 17 for the stepper motor. Control unit 17 preferably includes a microprocessor, a memory, and a motor driver (not separately shown in this Figure), which enable execution of a control algorithm for controlling the operation of the infusion pump to deliver the medicinal fluid as desired. The microprocessor controls the stepper motor to control the plunger position, and the plunger forces fluid from chamber 30.

In FIG. 7, plunger 42 is shown in a home position (at the 0 stepped position). This position corresponds to the initiation of a pump cycle. Note that plunger 42 is in contact with the elastic membrane of pumping chamber 30, causing a slight deflection of the membrane. At the beginning of a pump cycle, outlet valve 32 is closed, inlet valve 28 is open, supply valve 20 is in the open position, and pumping chamber 30 is filled with the appropriate amount of medicinal fluid.

The user of a stepper motor enables the infusion pump to provide a wide range of delivery rates, making the device especially well suited for use in administering fluid to pediatric patients at extremely low medicinal fluid delivery rates. For example, this infusion pump can supply a controlled rate of medicinal fluid at rates as low as 100 $\mu$l/hr. This rate is achieved by stepping the stepper motor once approximately every 70 seconds, so that each step delivers 2 $\mu$l of medicinal fluid to the patient.

The overall size of the foregoing infusion pump is quite small, and the pump can be operated with power provided by a storage battery. Therefore, it is very important that the drive system be as efficient as possible. Furthermore, since the device is used in close proximity to patients, it is important that the drive system be very quiet. Accordingly, it is desired to provide a stepper motor drive scheme suitable for use with an infusion pump and other devices that is both highly efficient and produces minimal ringing when the stepping motor is operating at very slow speeds.

SUMMARY OF THE INVENTION

In accord with the present invention, a method is provided for driving a stepper motor that achieves efficiency and substantially eliminates overshoot and its associated ringing effect. The method controls the current levels used in driving a stepper motor's windings such that when the motor is stepped, the velocity of the motor is substantially zero upon reaching a desired new stepped position, thereby eliminating overshoot and ringing and the wasted energy associated with these effects.

According to a first aspect of the invention, the stepper motor comprises a plurality of windings and poles that are configured to enable the stepper motor's rotor to rotate through a plurality of stepped positions when the windings are energized by a corresponding drive sequence. The method includes the step of energizing selected windings for a predetermined step time and at predetermined current levels to generate a magnetic field vector, which is not aligned with any of the motor's stepped positions. The current levels are determined as a function of the step time and dynamic single-step response characteristics of the stepper motor and load such that the motor velocity is substantially zero when the adjacent stepped position is reached. At this point, the stepper motor windings that were energized to make the rotor move are de-energized, and the rotor is held in place by the stepper motor's built-in detent torque. Since the velocity of the motor is substantially zero when the adjacent stepped position is reached, there is no overshoot, and ringing is thus eliminated. The step time is preferably derived from empirical testing of the motor when coupled to a load. The stepper motor preferably comprises a four-phase unipolar winding configuration in which a selected pair of windings are energized when stepping the motor.

According to another aspect of the invention, the current level for driving the pair of windings is determined by stepping the stepper motor through a single step by energizing a single winding at a current level suitable for moving the load. This procedure will produce a damped oscillation corresponding to the single-stepped position vs. time response of the motor. The step time is then determined by noting at the time at which the first peak in the damped oscillation occurs. The stepper motor is then stepped through a single step using a full-step drive mode by energizing an appropriate pair of windings at the same current level that was used when driving the single winding. This technique produces another damped oscillation having an overshoot past the commanded position to which the motor is being stepped. An angle corresponding to the direction of the unaligned magnetic field vector can then be determined as a function of the peak amplitude of the overshoot, and modified current levels usable to drive the pair of windings are derived, based on the sine and cosine of the magnetic field vector angle.

According to another aspect of the invention, a programmed logic device is provided for controlling the drive currents and the step time. The logic device, which is preferably a microprocessor or microcontroller, sends command signals to a digital-to-analog (DAC) converter, which produces a current output that is input to a motor drive circuit, preferably comprising a chopper drive, to produce the desired current levels in the windings.

A further aspect of the invention is directed to a stepper motor positioning device that generally implements the steps of the method described above. The positioning device comprises a stepper motor, driver circuit, and a control device that is programmed to implement functions that are generally consistent with the steps of the method. The positioning device can be used in conjunction with various positioning means, such as lead screws, ball screws, gear reducers, belt drives, rack and pinion drives, etc. In a preferred implementation, the positioning device is used in conjunction with a cassette-style medical infusion pump.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is directed to a pseudo half-step motor drive scheme for a stepper motor that results in greater efficiency and the elimination of overshoot and ringing at low speeds. The invention is described below with reference to its use with the cassette infusion pump discussed above. However, it should be noted that the pseudo half-step motor drive scheme is not limited to the specific application described herein, but instead, may be applied to a variety of applications that employ stepper motors.

The amount of current flowing through an electromagnet determines its magnetic field strength. Therefore, the amount of current flowing through the windings of each stator (in addition to the relative orientation of the stator faces to the rotor magnets) determines the torque that the stator exerts on the rotor. The stepper motor control system used in the present invention enables the magnitude of current flowing through each of the windings to be controlled separately, thereby providing more precise control of the rotor as it moves between stepped positions.

Figure 8:
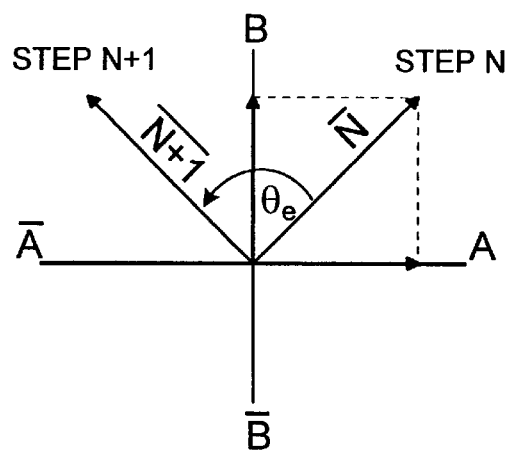
FIG. 8 is a vector diagram illustrating the torque applied to a stepper motor's rotor when different phases of the stepper motor are energized.

As shown in FIG. 8, the forces due to the magnetic fields of the two windings are modeled as vectors divided into horizontal and vertical components. The vectors are added to determine a resultant magnetic vector. As discussed above, the rotor arm will attempt to line itself up with the resultant magnetic vector. In the present invention, a two-channel 8-bit DAC converter is used with a peak-limited, constant off-time chopper drive to selectively set the currents in the windings of the stepper motor, and thus, control the magnitude and direction of the resultant magnetic vector.

If Step N+1 causes a rotor displacement of $\theta_e°$ from vector Step N, if vector $\overline{N}$ has a magnitude $\alpha$, and if vector $\overline{N+1}$ has a magnitude $\beta$, then the resultant magnitude is $\sqrt{\alpha^2+\beta^2}$, and the resultant direction is $\theta_e/90°\cdot\arctan(\alpha/\beta)°$ from Step N+1.

Figure 9:
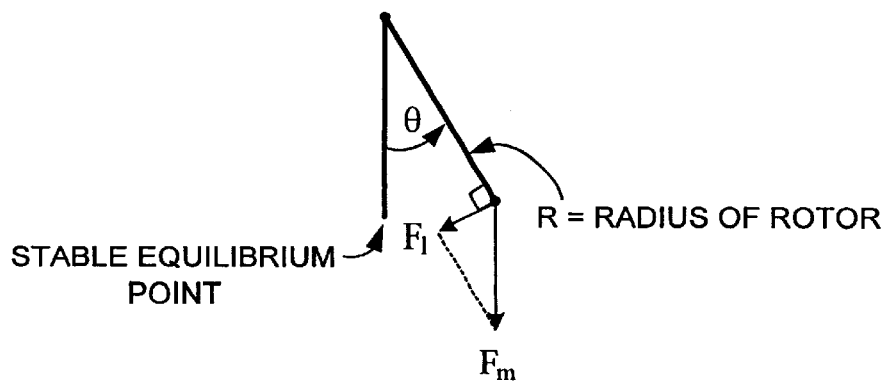
FIG. 9 is a vector diagram showing the effect of a magnetic force created when a rotor of a stepper motor is rotated away from an equilibrium position.

FIG. 9 and the following equations illustrate what happens when a magnetic vector with magnitude $F_m$ is offset from a stable equilibrium mechanical position by $\theta$, due to an applied torque, $T_l$.

$$T_l = -R \cdot F_m \cdot \sin(\theta) \tag{4}$$

As $\theta$ gets larger, there is a larger torque urging the rotor back to the equilibrium point. If $\theta$ is small, $\sin(\theta) \approx \theta$; then at equilibrium:

$$T_l = -R \cdot F_m \cdot \theta = T_m \tag{5}$$

If R=1, and the moment of inertia, J, is determined in terms of R, then:

$$T_m = -F_m \cdot \theta \tag{6}$$

The torque required to accelerate an inertial load due to the motor and lead screw is:

$$T_m = J \cdot \alpha \tag{7}$$

If the torque generated by viscous friction is defined to be clockwise, the differential equation of motion for this system is, $$T = J \frac{d^2\theta}{dt^2} + c \frac{d\theta}{dt} + F_m \theta = 0 \tag{8}$$

wherein C is the coefficient of viscous damping determined by the lubrication on the lead screw, and the force of the plunger on the lead screw.

Dividing through by J yields:

$$\frac{d^2\theta}{dt^2} + \frac{c}{J} \frac{d\theta}{dt} + \frac{F_m}{J} \theta = 0 \tag{9}$$

This equation indicates that if the motor is underdamped, it will step to its target position and oscillate or "ring."

Equation 9 can also be represented as follows:

$$\frac{d^2\theta}{dt^2} + 2\zeta\omega_n \frac{d\theta}{dt} + \omega_n^2 \theta \tag{10}$$

where:

$$\omega_n = \sqrt{\frac{F_m}{J}} \quad \text{(undamped natural frequency (rad/sec))} \tag{11}$$

$$\gamma = \zeta \omega_n = \frac{c}{2J} \text{ (coefficient of exponential decay)} \quad (12)$$

and $$\omega_d = \sqrt{\omega_n^2 - \gamma^2} \quad (13)$$
$$= \omega_n \sqrt{1-\zeta^2} \text{ (damped natural frequency (rad/sec))}$$

This differential equation can be solved to determine a time-based angular displacement for a step response, as follows:

$$\theta(t) = \frac{X}{\omega_n^2} + e^{-\zeta \omega_n t}\left(X_1 \cos\left(\sqrt{1-\zeta^2}\cdot\omega_n t\right) + X_2 \sin\left(\sqrt{1-\zeta^2}\cdot\omega_n t\right)\right) \quad (14)$$

Assume the initial conditions for $\theta(0)=0$, and $$\frac{d\theta}{dt}(0) = 0,$$

in order to obtain two independent equations for $X_1$ and $X_2$:

$$X_1 = \theta(0) - \frac{X}{\omega_n^2} = -\frac{X}{\omega_n^2} \quad (15)$$

which yields the steady state position.

Differentiating $\theta(t)$, and letting t=0, yields:

$$X_2 = \frac{\frac{d\theta}{dt}(0) + \zeta\omega_n X_1}{\sqrt{1-\zeta^2}\,\omega_n} = \frac{\zeta X_1}{\sqrt{1-\zeta^2}} = -\frac{\zeta X}{\sqrt{1-\zeta^2}\,\omega_n^2} \quad (16)$$

Thus, the motor position equation as a function of time is:

$$\theta(t) = \frac{X}{\omega_n^2}\left\{1 - e^{-\zeta\omega_n t}\left(\cos\left(\sqrt{1-\zeta^2}\cdot\omega_n t\right) + \frac{\zeta}{\sqrt{1-\zeta^2}}\sin\left(\sqrt{1-\zeta^2}\cdot\omega_n t\right)\right)\right\} \quad (17)$$

Several of the foregoing equations can be substituted into this equation to yield simplified equations for determining the rotor position, the rotor steady-state position, amplitude, and phase shifts, as follows:

$$\theta(t) = \theta_{SS}\left\{1 - \frac{e^{-\gamma t}}{\sqrt{1-\zeta^2}}\cos(\omega_d t - \phi)\right\} \text{ (rotor position)} \quad (18)$$

$$\theta_{SS} = \frac{X}{\omega_n^2} \text{ (rotor steady state position)} \quad (19)$$

$$X = \sqrt{X_1^2 + X_2^2} \text{ (amplitude)} \quad (20)$$

$$\phi = \tan^{-1}\left(\frac{X_2}{X_1}\right) = \tan^{-1}\left(\frac{\zeta}{\sqrt{1-\zeta^2}}\right) \text{ (phase shift)} \quad (21)$$

where $$X_1 = -\frac{X}{\omega_n^2} \quad (22)$$

$$X_2 = -\frac{\zeta X}{\sqrt{1-\zeta^2}} \quad (23)$$

If $(C^2-4JF_m)$
  <0, the system is underdamped, (i.e., $\zeta$<1), if
  >0, the system is overdamped, and if
  =0, the system is critically damped (i.e., zero overshoot and ringing).

The pseudo half-step motor drive scheme in accord with the present invention adjusts the current in the stator windings such that the resulting magnetic vector will be set at a given magnitude and at a given $\Delta\theta$ angle from the rotor to move the motor such that overshoot and oscillations are eliminated.

The plunger motor system preferably comprises a 3.6° stepper motor, a lubricated lead screw, a plunger, and a cassette with a diaphragm that is contacted by the plunger, and is subjected to a range of pressures, as discussed above. The stepper motor rotates, turning the lead screw in stepped increments, which moves the plunger into and out of the cassette, deflecting the diaphragm into the pumping chamber of the cassette. Control of the plunger position is performed through a software program that controls the current flowing through the stator windings via a current-control circuit, which includes the 8-bit DAC and motor drive circuitry, further details of which are discussed below. The objective is to reliably incrementally move the stepper motor rotor, while consuming as little power as possible. A further objective is the elimination of overshoot and ringing.

Single Step Response

When the magnetic vector ($\theta_e$) changes by 90°, the stepper motor mechanically rotates 3.6° (generally after a decayed oscillation). In this analysis, it is assumed that the variability in motor inertia (J) and damping coefficient (c) from mechanism to mechanism and over the operating lifetime of the device will be negligible. Also, the damping coefficient (c) may change with increased pressure on the plunger, but this effect can be characterized and is assumed to be repeatable.

From Equation (11), the natural frequency of oscillation is $$\omega_n = \sqrt{\frac{F_m}{J}}\,;$$

since J is constant, $\omega_n$ is determined by the magnitude of the magnetic force vector, $F_m$. Since $F_m$ can be controlled by varying the currents in the windings, so can $\omega_n$.

From Equation (13), the damped angular frequency equation is $$\omega_d = \sqrt{\omega_n^2 - \gamma^2}\,.$$

When $\gamma<<\omega_n$, $\omega_d\approx\omega_n$, which is primarily determined by $F_m$. In addition, the amplitude of the motor position (X) is bounded by the exponential factor $e^{-\gamma t}$, which is independent of $F_m$. As provided by Equation (20), the amplitude of the motor position is determined by $$X = \sqrt{X_1^2 + X_2^2}\,.$$

Figure 10:
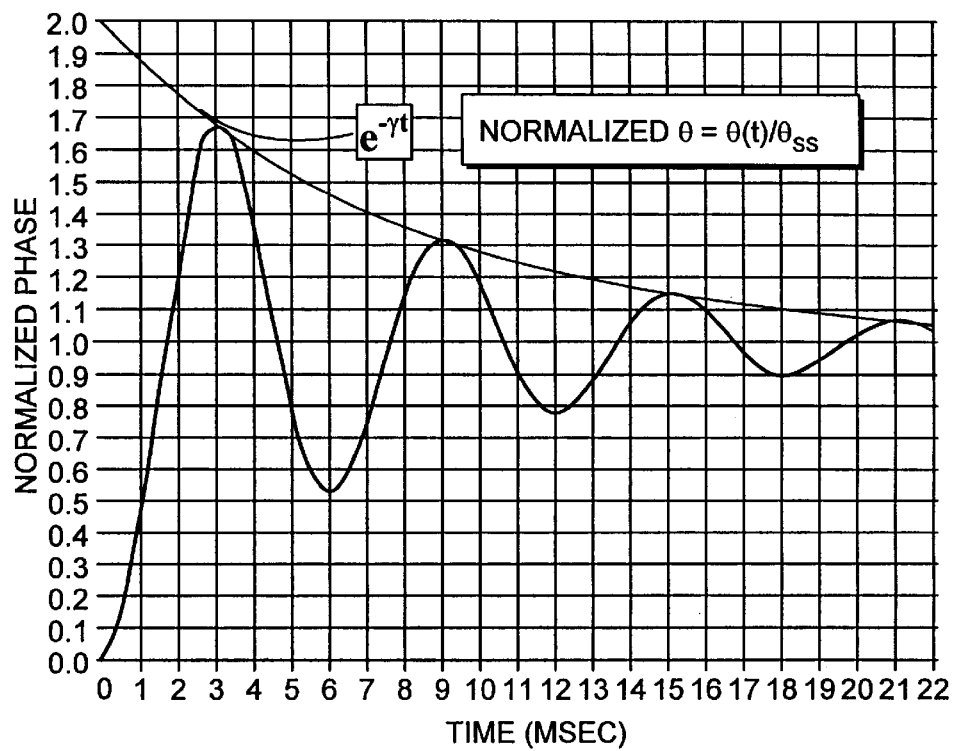
FIG. 10 is a vector diagram showing an underdamped oscillation corresponding to a normalized single-step amplitude vs. time response of a stepper motor.

The result of a normalized single step response vs. time for a stepper motor coupled to the leadscrew/plunger mechanism used in the infusion pump is shown in FIG. 10. The normalized phase axis corresponds to electrical phase angles that are related to stepped positions such that 0.0 corresponds to an initial stepped position, 1.0 corresponds to a stepped position that is one step away from the initial stepped position, and 2.0 corresponds to a stepped position that is two steps away from the initial stepped position. The envelope of the oscillation is bounded by the exponential decay factor $e^{-\gamma t}$.

From the foregoing equations, it can be recognized that $\omega_n$, and the peak overshoot position $|\theta(t_1)|_{max}$, can be separately set by adjusting $F_m$ and X.

Pseudo Half-Stepping Motor Drive Method

The objective of the Pseudo Half-Step Motor Drive method is to move the rotor to a position $\theta(t_1)$, and have $$\frac{d\theta}{dt}(t_1) = 0$$

(i.e., achieve a zero velocity) at the moment that the rotor reaches this position. Using the motor phase position equation, the oscillation reaches zero velocity when $(\omega_d t - \phi) = 180°$. The time period that the windings are energized, referred to as the step time $t_1$, is software programmable, and $F_m$ and X are set so that the rotor rotates 90° (electrical), and reaches zero velocity at the end of the step time $t_1$, which is empirically determined based on the load and the motor characteristics, as discussed below. Also, the rotor will be held at this position for some time, to overcome any variations in the transfer function between the DAC setting and the actual $F_m$ produced by the winding currents.

Figure 11:
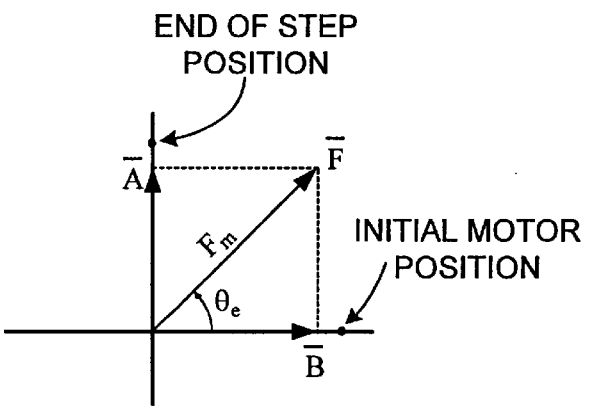
FIG. 11 is a vector diagram illustrating the effect of changing the magnetic force produced by the current in the windings of a stepper motor.

FIG. 11 illustrates the magnetic vector force $F_m$ that acts on the rotor when windings A and B of the stepper motor are driven, such that the resultant force $F_m$ produces a torque when result in an electrical angle displacement of $\theta_e$, where $$\theta_e \propto \frac{X}{\omega_n^2}.$$

Figure 12:
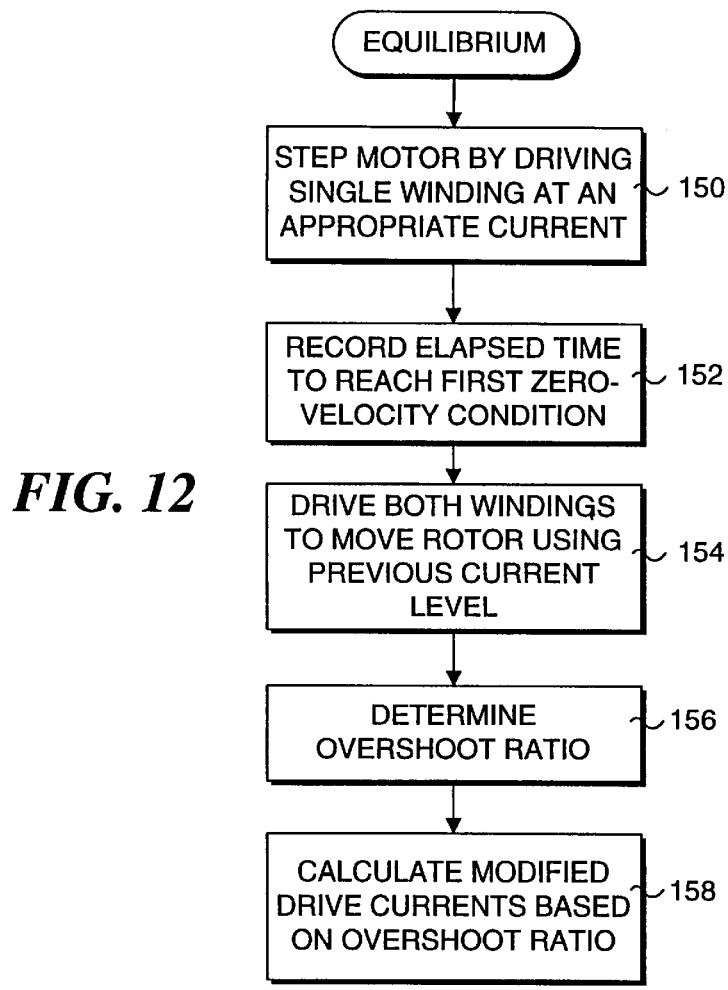
FIG. 12 is a flowchart illustrating the logic used in the present invention to determine a modified drive current that should be applied to the stepper motor to minimize overshoot.
Figure 13:
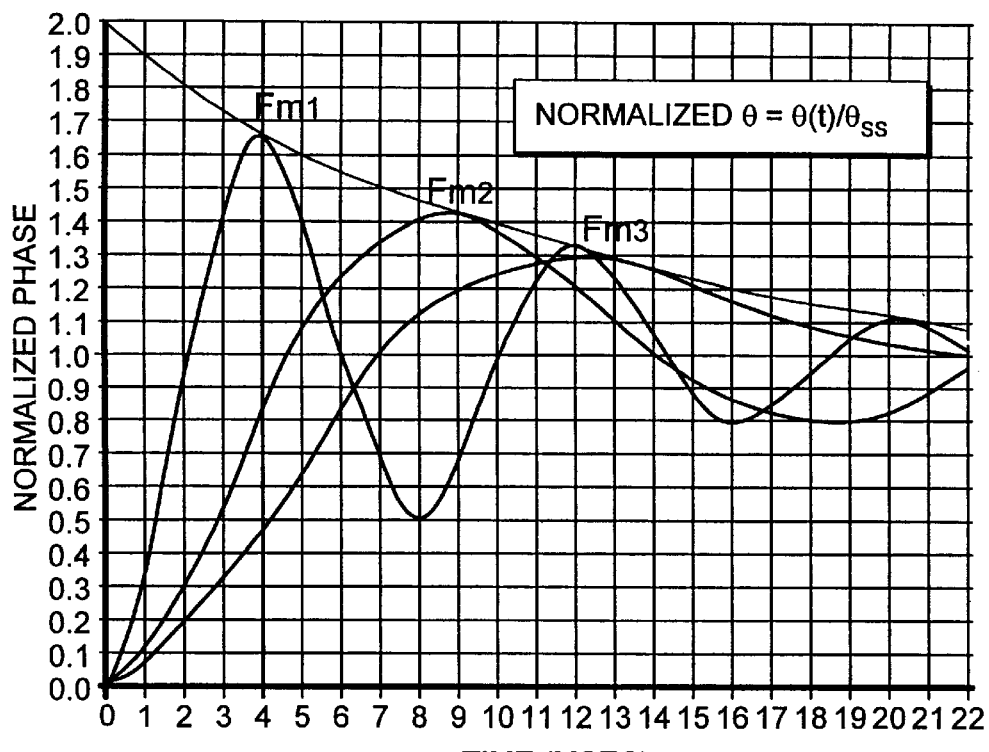
FIG. 13 is graph of normalized single-step phase amplitude vs. time response showing the effect of changing the strength of the magnetic force vector.

FIG. 12 shows a logic flowchart for determining the drive parameters (current and duration) for a given stepper motor and load so that when the motor is stepped, there is minimal overshoot and no ringing. The process starts with the motor in an equilibrium position (i.e., in a detent position). In a block 150, the motor is stepped through a single step by driving one of the motor windings (either A or B) with a current that is empirically determined to be sufficient (with an appropriate safety factor) to drive the lead screw/plunger mechanism through its full range of motion. This action will produce a single-step response, similar to the underdamped oscillations shown in FIG. 13. The exact shape of the resulting damped oscillation will depend on the particular load and motor characteristics. The magnetic force $F_m$ generated by the stator corresponding to the energized winding will be proportional to the current level in the winding. The effect of varying $F_m$ (i.e., of varying the current) while holding X constant is shown in FIG. 13. As would be expected, a larger $F_m$ will reduce the elapsed time to reach the next step, but will produce a large amount of overshoot, while a lower $F_m$ results in an increase in time, with a corresponding decrease in overshoot.

The elapsed time until the first oscillation peak occurs (i.e., until the first instance in which a zero-velocity condition exists) is then recorded in a block 152. This time corresponds to the step time period $t_1$. Next, in a block 154, the motor is rotated through a single step by energizing both windings for the step time using the same current level that was applied when stepping the motor with the single winding energized (i.e., using a full-step drive mode for the step time). This action will result in another underdamped oscillation, similar to that shown in FIG. 10. An overshoot ratio corresponding to the amplitude of the overshoot at the first peak relative to the 90° electrical step angle is then determined in a block 156, by dividing the electrical angle at the overshoot peak by 90°.

Modified drive current levels based on the overshoot ratio are then calculated in a block 158, as follows. It is desirable for the first overshoot to coincide with the normal full-step angle of the motor, which can be accomplished by reducing the commanded angle, $\Delta\theta_e$, based on the overshoot ratio:

$$\Delta\theta_e = 90°/\text{overshoot ratio} \tag{24}$$

The winding currents that will produce this reduced commanded angle can then be determined by the following equations:

$$A = F_m \sin(\Delta\theta_e) \tag{25}$$

$$B = F_m \cos(\Delta\theta_e) \tag{26}$$

wherein $F_m$ corresponds to the winding current level used above when driving the motor in the full-step mode to determine the overshoot ratio.

When the windings in the stepper motor are energized at these modified current levels, a magnetic field vector is developed corresponding to a commanded angle $\Delta\theta_e$ such that the magnetic field vector does not align with a stepped position. As a result, the rotor will rotate past (overshoot) this commanded angle, and the peak of the overshoot will coincide with a stepped position at the end of the step time. At this point, the currents in the windings are de-energized, and the rotor is held in the stepped position by the motor's built-in detent torque. Since the peak overshoot corresponds to a zero-velocity condition, the new stepped position is achieved with substantially zero velocity, thereby eliminating overshoot and ringing.

EXAMPLE

Figure 14:
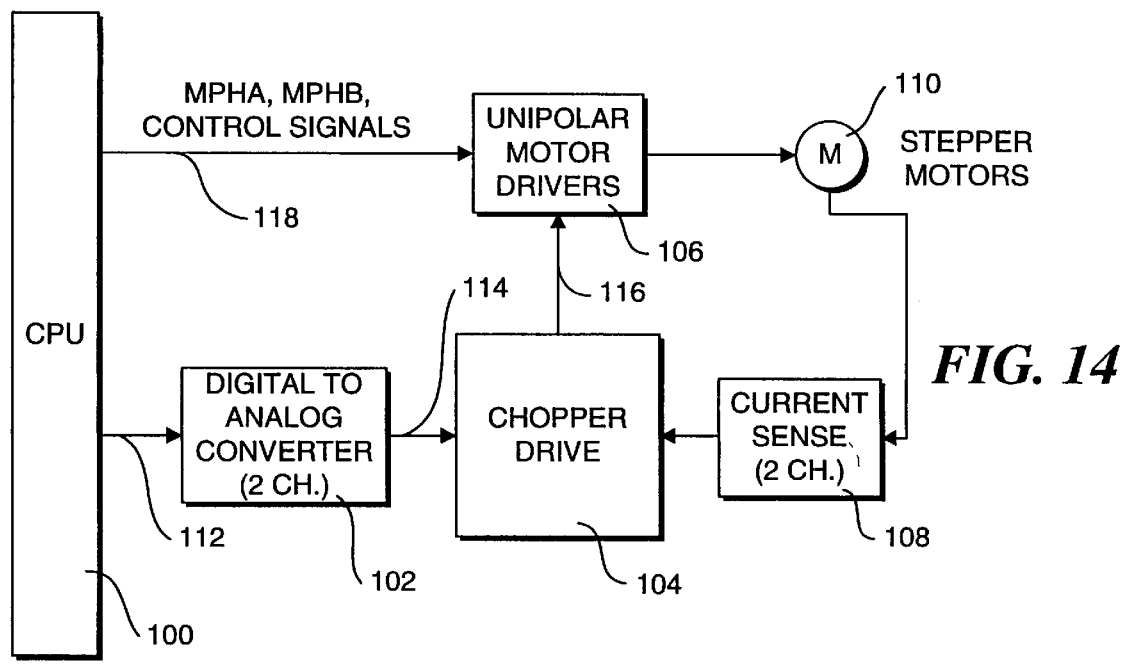
FIG. 14 is a schematic block diagram of an exemplary control/drive circuit for driving a unipolar stepper motor.

Suppose that a stepper motor with very little damping is used, and it is determined that that $t_1 = 3.0$ ms when energizing a single winding with a suitable current to move the plunger. The suitable current can be determined by incrementally increasing the current in the single winding until the motor moves the load through a desired range of motion. This movement can be accomplished with the motor control/drive circuit shown in FIG. 14, which includes a microprocessor or microcontroller 100, a two-channel DAC 102, a two-channel chopper drive 104, a unipolar motor drive circuit 106, and a two-channel current sense circuit 108. The motor control/drive circuit is used to drive a stepper motor 110. The microprocessor is programmed to control the current levels in the motor windings, as well as to supply the motor drive circuit with appropriate control signals (i.e., current commands, phase sequencing, etc.) for stepping the motor. The microprocessor supplies a digital current-command control signal 112 for input to the two-channel DAC. The DAC converts the digital input signal into an analog voltage output signal 114, which is provided as an input to the chopper drive circuit. Chopper drive circuits are commonly used for driving stepper motors, and include pulse-width modulated drives, and peak-limited, constant off-time drives. The chopper drive produces a current output 116 that is proportional to the analog signal produced by the DAC. Current output 116 is received as an input to a unipolar stepper motor drive circuit.

In addition to providing the current-command control signal, the microprocessor also provides a stream of motor control signals 118 to the motor drive circuit, which provides current to the windings in the stepper motor based on the chopper drive output and the motor control signals. Desired current levels are maintained in the motor windings through the use of a two-channel current sense circuit, which provides a closed-loop feedback signal to the chopper drive so as to enable adjustment of the chopper drive current output.

Figure 1:
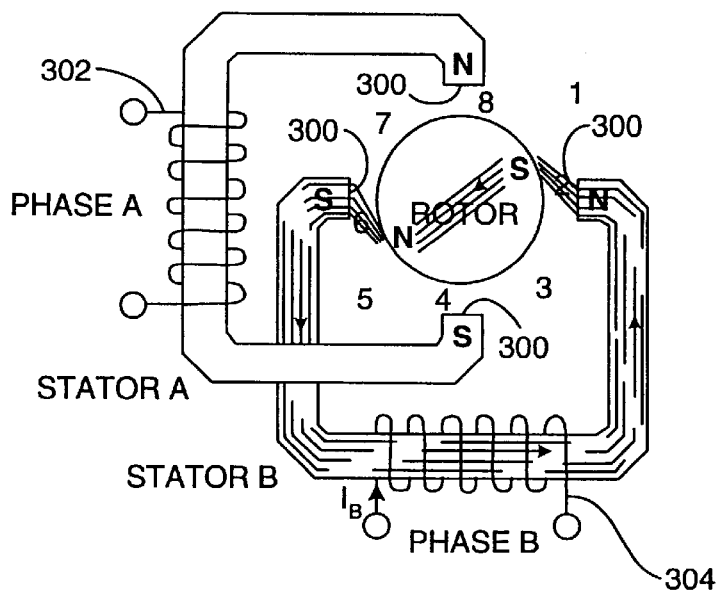
FIG. 1 is a simplified schematic diagram of magnetic circuits that are employed in a bipolar stepper motor.
Figure 5:
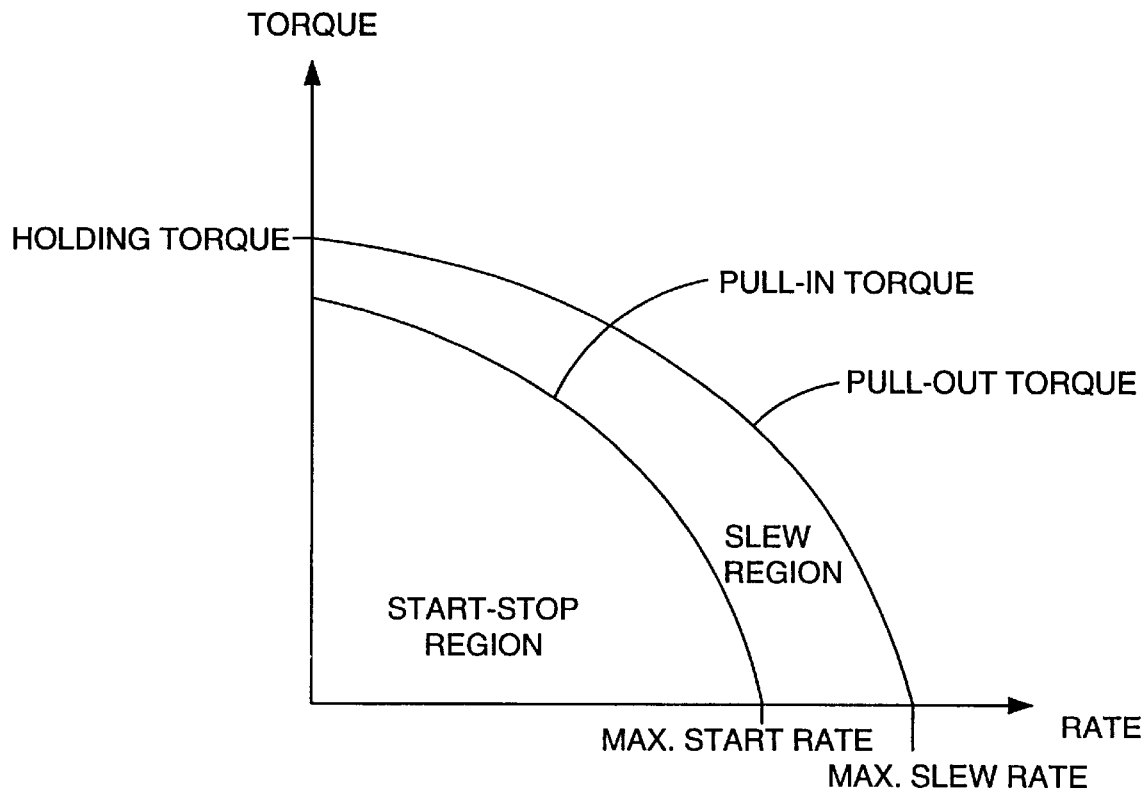
FIG. 5 is a graph illustrating various operating regions associated with stepper motors.
Figure 2A:
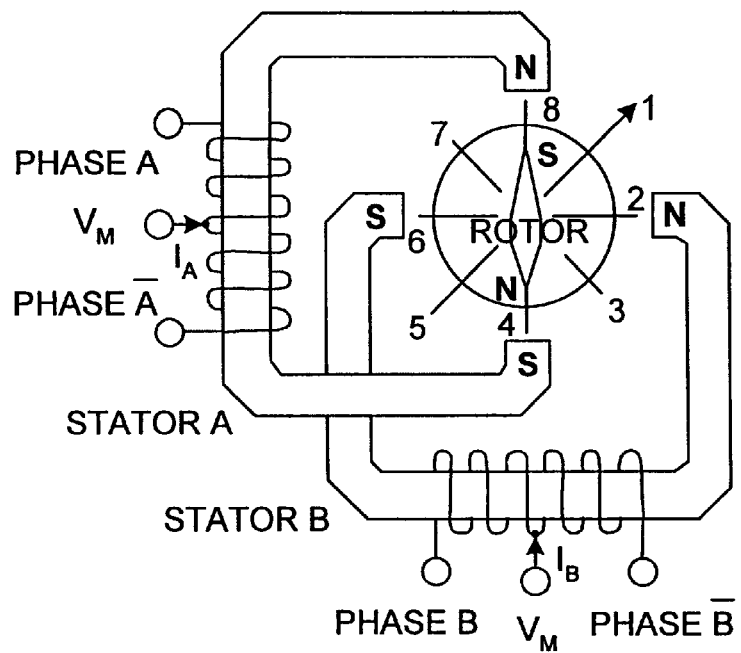
FIGS. 2A and 2B are simplified schematic diagrams illustrating primary components of unipolar and bipolar stepper motors, respectively.
Figure 2B:
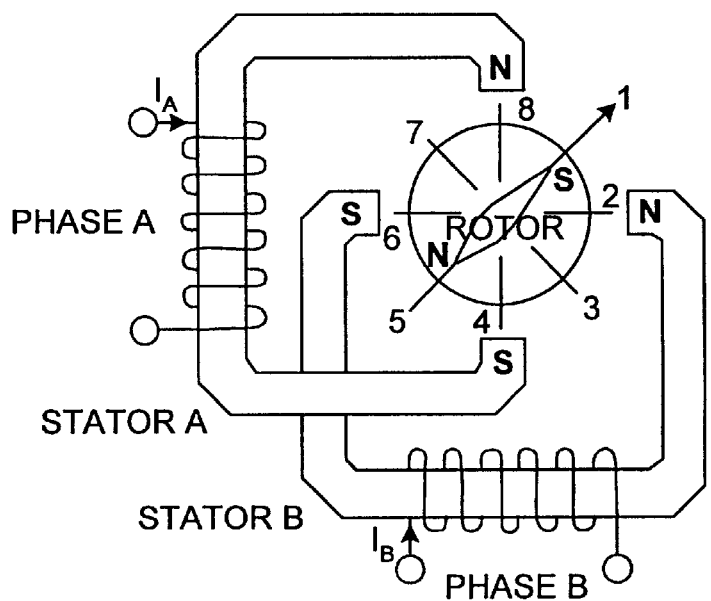
Figure 3A:
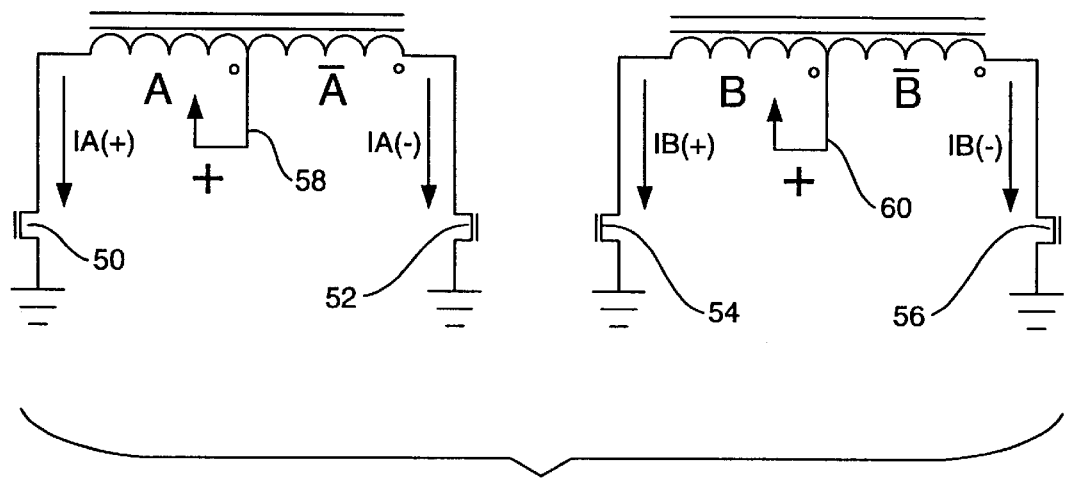
FIGS. 3A and 3B are schematic representations of the drive circuitry used in unipolar and bipolar stepper motors, respectively.
Figure 3B:
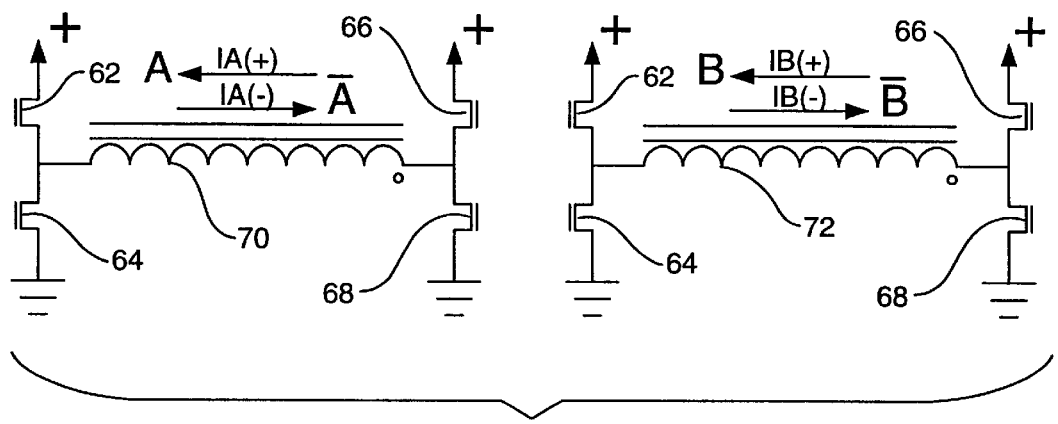
Figure 4A:
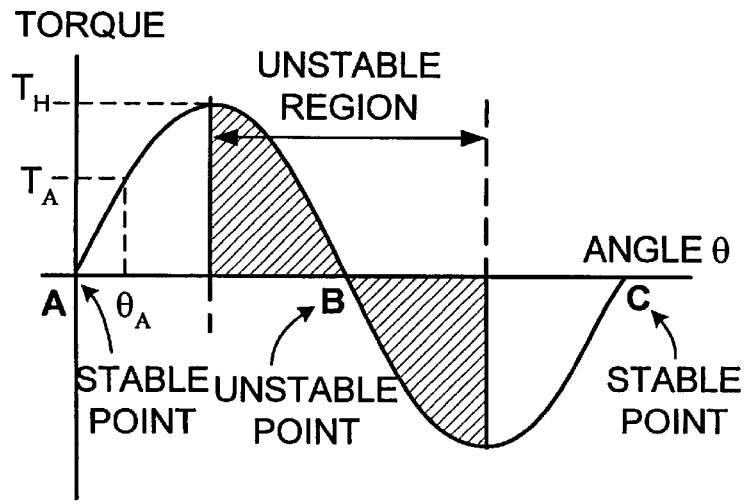
FIG. 4A is a graph showing a torque vs. position curve for an ideal stepper motor.
Figure 4B:
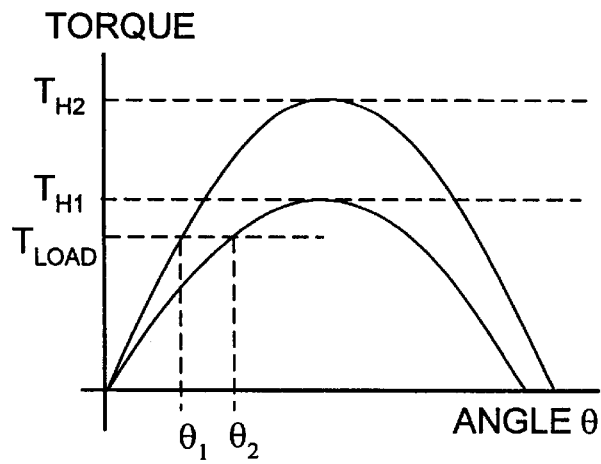
FIG. 4B is a graph illustrating the relationship between displacement angle, load, and holding torque for a stepper motor.
Figure 6:
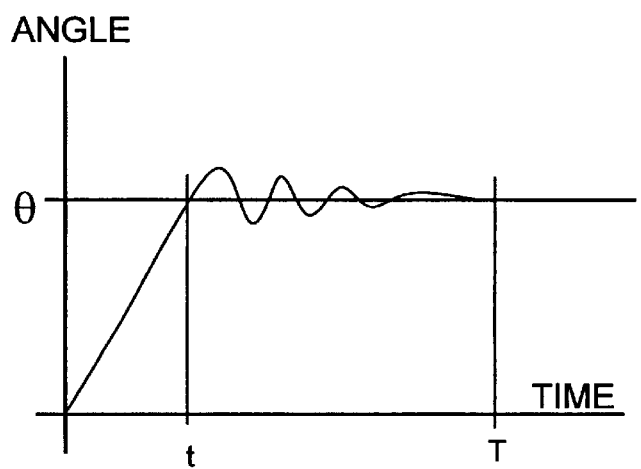
FIG. 6 is a graph of rotor angle vs. time, illustrating a typical underdamped oscillation that results when moving a stepper motor rotor through a single step.
Figure 7:
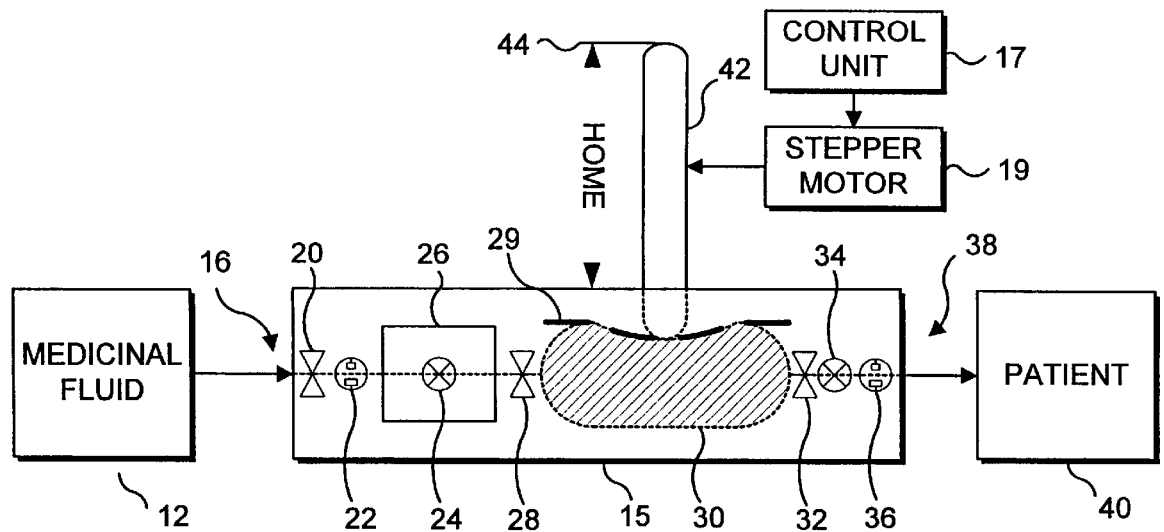
FIG. 7 is a schematic block diagram of a cassette-type infusion pump that includes a stepper motor, showing an exemplary application of the present invention.

In this example, it is desired to have the rotor reach 90° (electrical) after both windings are energized for 3.0 ms. Note that in the foregoing explanation, the use of only a single channel was discussed. In order to simultaneously drive both windings, the signals on both channels must be processed. Using the same DAC setting for both channels, both windings are energized for 3.0 ms, which causes the rotor to rotate back and forth past 90°, resulting in the underdamped oscillation shown in FIG. 10. The first zero-velocity condition corresponds to a normalized phase value of about 1.68 (i.e., the ratio of the electrical angle of the peak amplitude to the 90° step angle), indicating that the overshoot is 68% beyond the desired 90° position. Therefore, by setting $$\Delta\theta_e = \frac{\pi/2}{1.68} = 0.595 \cdot (\pi/2) = 0.935 \text{ rads},$$

the rotor should reach the 90° position at the first peak of the oscillation such that the velocity upon reaching the peak is substantially zero. This result can be obtained by attenuating the amplitude of the steady-state motor position to 59.5% of its nominal 90° value, which is accomplished by modifying the current levels in both windings A and B using Equations (25) and (26), with $\Delta\theta_e$=0.935 rads. The windings A and B are then energized at their calculated current levels for the step time, causing a first overshoot peak to occur at 90° (electrical), and the switches in both windings are then opened (see FIG. 3A), de-energizing the windings. At this point, since the rotor has negligible velocity, it is easily held in place by the motor's inherent detent torque.

Figure 15:
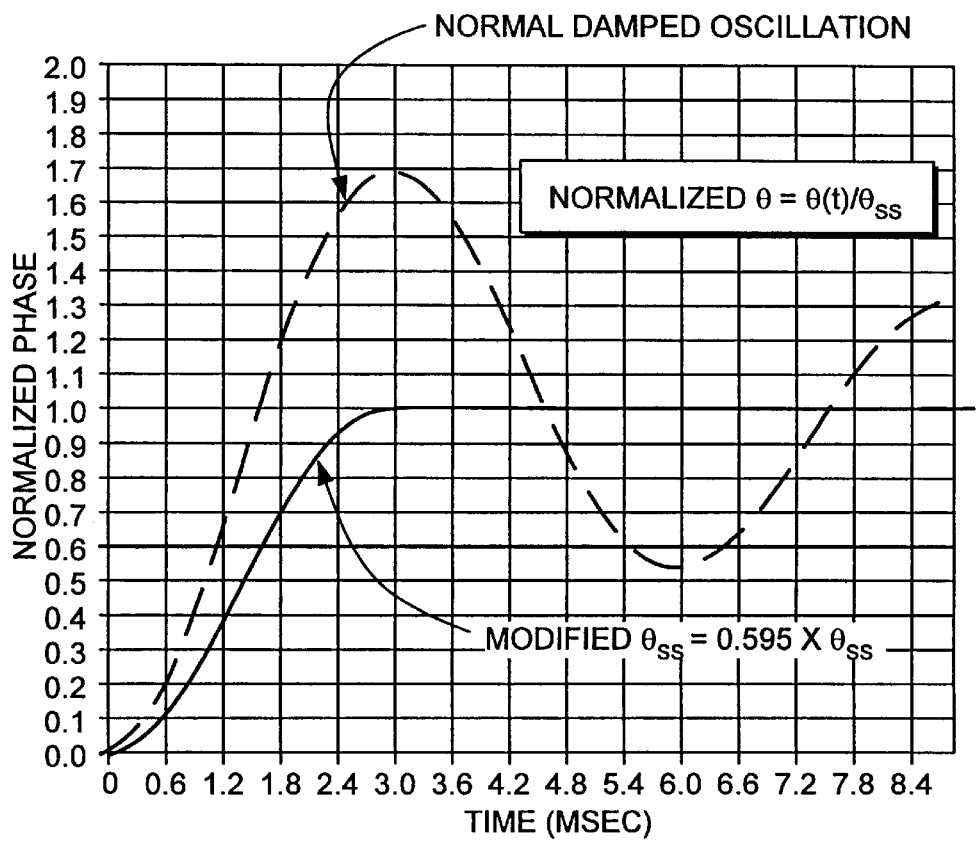
FIG. 15 is a graph of normalized single-step amplitude vs. time response that illustrates the improved step response produced by the drive method of the present invention.

This method enables the rotor to be stepped with substantially zero overshoot, thereby improving the efficiency of the positioning mechanism and eliminating ringing. The results of applying the method are shown in FIG. 15, wherein the modified current levels in windings A and B produce a critically-damped step response corresponding to the example discussed above.

Figure 16A:
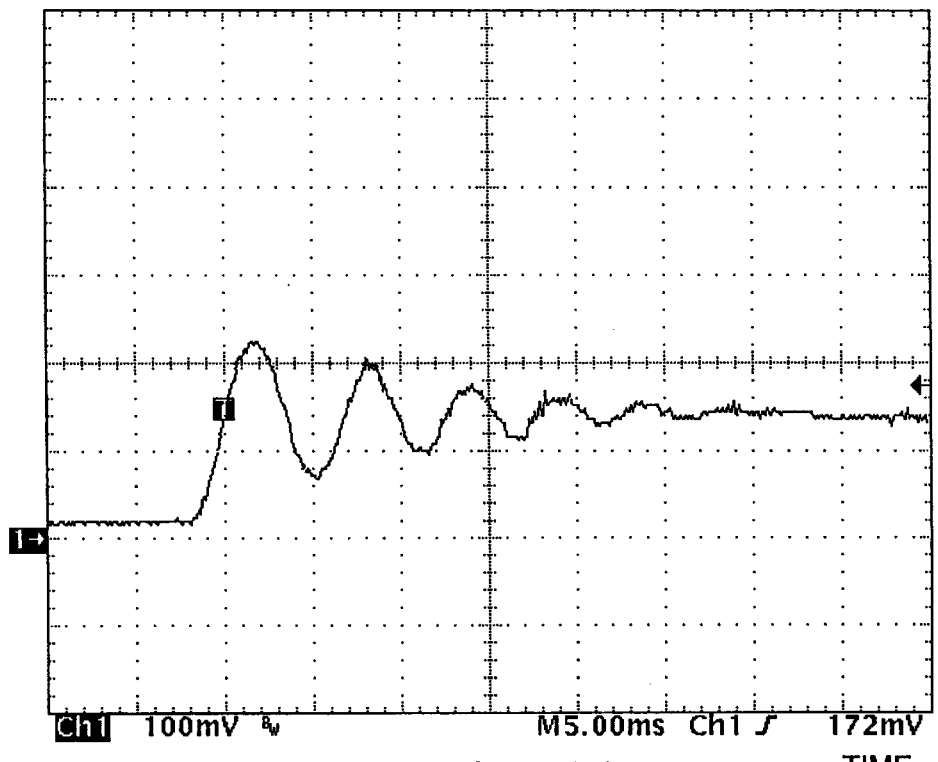
FIG. 16A represents an oscilloscope trace of rotor position vs. time for a stepper motor using a conventional half-step drive sequence.
Figure 16B:
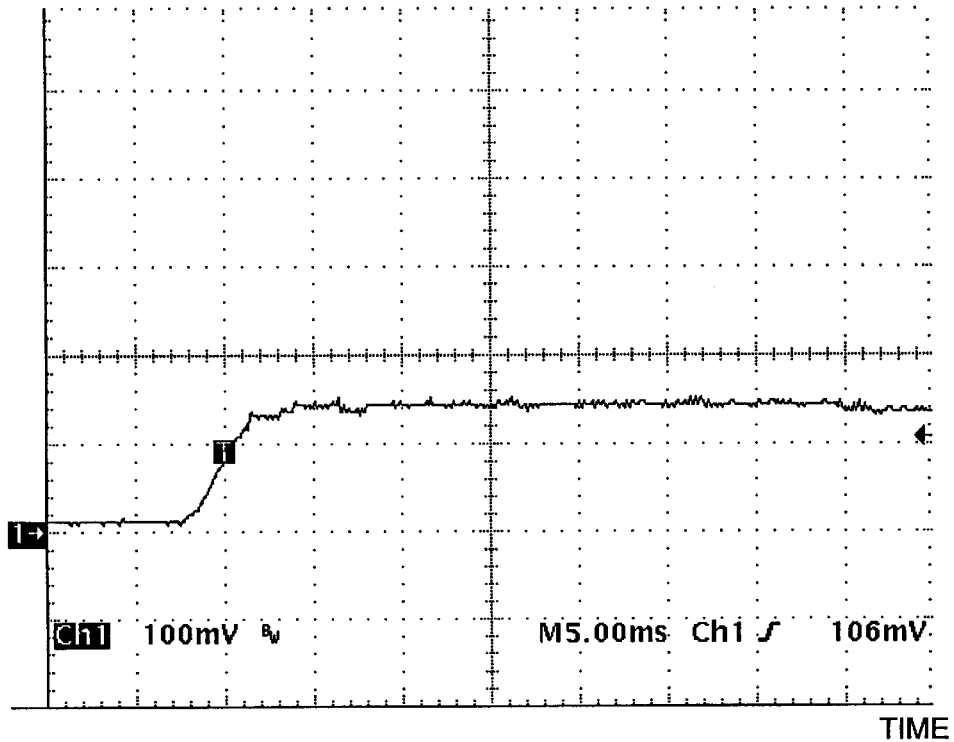
FIG. 16B represents an oscilloscope trace of rotor position vs. time for a stepper motor using the drive method of the present invention.

The single-step responses of an actual motor/load when using a conventional half-step drive mode and the pseudo half-step drive mode of the present invention are respectively shown in FIGS. 16A and 16B, which the display of electrical rotor angle vs. time produced by an oscilloscope during experimental testing. The graphs shown in the Figures corresponds to testing of a 3.6° stepper motor that was used to rotate a lubricated lead screw employed to actuate a plunger in the infusion pump discussed above. As is clearly shown in FIG. 16A, even with the damping provided by the load on the motor, there was still a substantial amount of overshoot and ringing when the conventional half-stepping drive mode was used. In contrast, when the pseudo half-step drive method in accord with the present invention was used, the motor rotor rotated through a single step with substantially no overshoot or ringing, as shown in FIG. 16B.

In the foregoing description of the preferred embodiment of the invention, a unipolar stepper motor is used. This example is not meant to be limiting, as an appropriate bipolar motor could also be used with the method of the present invention. Likewise, the use of a lead-screw mechanism as a load is not intended to be limiting on the scope of the present invention. Any type of rotary or linear positioning mechanism, including gear reducers, ball-screw drives, belt drives, rack and pinion drives, etc., could be used in connection with a stepper motor while practicing the present invention. When using any of these positioning mechanisms, the modified current levels and step time can be determined by evaluating the dynamic single step response of the stepper motor when coupled to a specific mechanism and driving any load connected to the mechanism. Furthermore, as an alternative to use of a microprocessor or microcontroller to control the drive circuit, other types of logic devices, such as programmable logic devices and application specific integrated circuits can be used for this purpose.

Although the present invention has been described in connection with a preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for driving a stepper motor having a detent torque and defining a plurality of stepped positions, the stepper motor being operatively coupled to a load and comprising a rotor and a plurality of windings, said plurality of windings being selectively energized to rotate the rotor in a stepped motion from a current stepped position to an adjacent stepped position, the method comprising the steps of:
    (a) energizing selected windings among said plurality of windings for a predetermined step time and at predetermined current levels so as to produce a magnetic field vector that is not aligned with a stepped position, said predetermined step time and predetermined current levels having been determined to enable the rotor to achieve the adjacent stepped position without substantial overshoot and with substantially a zero velocity when the step time has expired; and
    (b) de-energizing the windings that were energized in step (a) after the step time, the rotor being held in the adjacent stepped position by the stepper motor detent torque.

2. The method of claim 1, wherein the stepper motor comprises a unipolar stepper motor having four phases, each phase corresponding to a respective winding of the stepper motor.

3. The method of claim 2, wherein two of the four windings are concurrently energized in step (a) at different current levels so as to produce the magnetic field vector.

4. The method of claim 3, wherein the current levels for driving the two windings are determined by performing the steps of:
    (a) stepping the rotor of the stepper motor to rotate through a single step by energizing a single winding at a current level that is sufficient to move the load, thereby producing a single-stepped position versus time response that comprises a first damped oscillation having a plurality of peaks;
    (b) determining a step time by analyzing the first damped oscillation to determine a time at which a first peak of the damped oscillation occurs after the single winding was energized;

(c) stepping the stepper motor through a single step to an adjacent stepped position using a full-step drive mode by energizing a selected pair of windings at the current level that was used when energizing the single winding, thereby producing a single-stepped position vs. time response that comprises a second damped oscillation having an overshoot past the adjacent stepped position; and (d) determining the pre determined winding current levels used to energize the two windings as a function of a peak amplitude of the overshoot in the second damped oscillation and the current level used when energizing the single winding.

5. The method of claim 4, wherein a single step defines a 90° electrical angle, and wherein the step of determining the predetermined winding current levels comprises the steps of:

(a) determining an electrical angle corresponding to the peak amplitude of the overshoot in the second damped oscillation;

(b) determining an overshoot ratio by dividing the electrical angle by 90°;

(c) determining an electrical angle corresponding the magnetic field vector by dividing 90° by the overshoot ratio; and (d) determining respective predetermined current levels for energizing the two windings by multiplying the current level used in the full-step driving mode by the sine and cosine of the electrical angle.

6. The method of claim 1, wherein current levels in the windings and the step time are controlled by a logic device.

7. The method of claim 6, where in the logic device controls the current levels in the windings by issuing command signals to at least one digital-to-analog converter, which produces a voltage output that is received as an input by a motor drive circuit, said motor drive circuit producing the current levels based on the digital-to-analog converter voltage output.

8. The method of claim 1, wherein the current level sufficient to move the load comprises a minimum current level required for the stepper motor to move the load through a full-range of motion.

9. A positioning device comprising:

(a) a stepper motor having a rotor and a plurality of windings, said plurality of windings being selectively energized to rotate the rotor in a stepped motion from a current stepped position to an adjacent stepped position, said stepper motor further having a characteristic detent torque that tends to maintain the rotor in a stepped position;

(b) a driver circuit coupled to the windings, said driver circuit producing current to drive selected windings among the plurality of windings in the stepper motor based on control signals that are input to the driver circuit; and (c) a driver control device, which produces the control signals that cause the driver circuit to step the stepper motor through a single step by:

(i) energizing selected windings among said plurality of windings for a predetermined step time at current levels selected to produce a magnetic field vector that is not aligned with a stepped position such that the rotor completes the single step by rotating to the adjacent stepped position without an overshoot, and with substantially a zero velocity when the predetermined step time has expired; and (ii) de-energizing the windings that were energized in step (i) after the predetermined step time has expired, the rotor being then held in the adjacent stepped position by the stepper motor detent torque.

10. The positioning device of claim 9, wherein the drive control device comprises a logic device programmed to perform steps (c)(i) and (c)(ii).

11. The positioning device of claim 10, wherein the logic device comprises one of a microprocessor and a microcontroller.

12. The positioning device of claim 9, wherein the stepper motor comprises a unipolar stepper motor having four phases and four windings, each phase corresponding to an associated different one of the four windings.

13. The positioning device of claim 12, wherein two of the four windings are concurrently energized in step (c)(i) at different current levels so as to produce the magnetic field vector.

14. The positioning device of claim 9, wherein the current levels and predetermined step time are based on a dynamic behavior of the stepper motor when moving the load.

15. The positioning device of claim 9, wherein the drive circuit comprises a chopper drive.

16. A method for driving a stepper motor having a detent torque and defining a plurality of stepped positions, the stepper motor being operatively coupled to a load and comprising a magnetized rotor and a plurality of windings, said plurality of windings being selectively energized to rotate the rotor from a current stepped position to an adjacent stepped position, rotation of the rotor between the current stepped position and the adjacent stepped position corresponding to a fundamental electrical step angle, the method comprising the steps of:

(a) determining an attenuated electrical step-command angle corresponding to a magnetic field vector that produces a torque on the magnetized rotor such that the magnetized rotor is caused to rotate with a damped oscillation having a first angular peak equal to the fundamental electrical step angle, said first peak being reached after an elapsed time;

(b) energizing a pair of selected windings among said plurality of windings at different predetermined current levels based on the attenuated electrical step-command angle determined in step (a) for a step time equal to the elapsed time, thereby causing the magnetic rotor to rotate from the current stepped position to the adjacent stepped position such that the rotor has substantially a zero velocity upon reaching the adjacent stepped position; and (c) de-energizing the windings that were selectively energized in step (b) after the step time, whereby the magnetic rotor is held in the adjacent stepped position by the stepper motor detent torque.

17. The method of claim 16, wherein the attenuated step-command angle is determined by:

(a) stepping the stepper motor through a single step by energizing a single winding at a current level sufficient to move the load, thereby producing a single-stepped position versus time response that comprises a first damped oscillation having a plurality of peaks;

(b) stepping the stepper motor through a single step to an adjacent stepped position using a full-step drive mode by energizing a selected pair of the windings at the current level used in stepping the stepper motor through a single step, thereby producing a single-stepped position versus time response comprising a second damped oscillation having an overshoot past the adjacent stepped position;

(c) determining an overshoot ratio based on a peak amplitude of the overshoot and the fundamental step angle; and (d) determining the attenuated electrical step-command angle by dividing the fundamental electrical step angle by the overshoot ratio.

18. The method of claim 16, wherein the stepper motor is a four-phase unipolar stepping motor.

19. The method of claim 16, wherein the different predetermined winding currents in the pair of selected windings are determined as a function of the sine and cosine of the attenuated electrical step-command angle, respectively.

* * * * *